Figure 1:
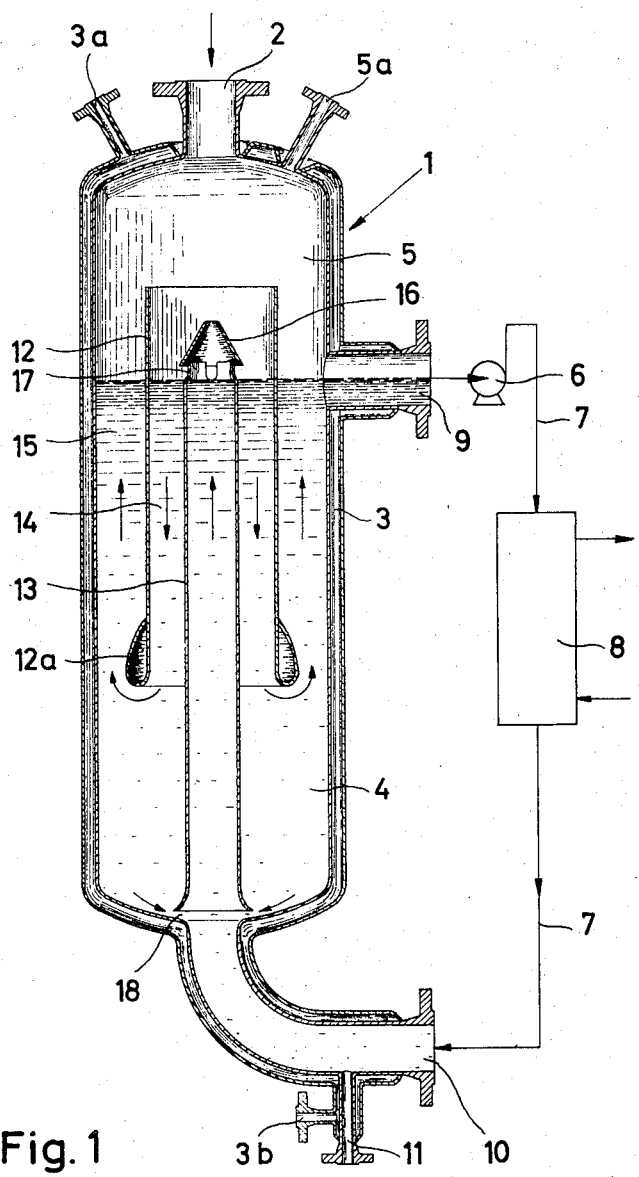

INVENTORS
HANSJUERGEN ULLRICH
MANFRED DIETZE
BY Bair, Freeman & Molinare
ATTORNEYS

United States Patent Office 3,369,873
Patented Feb. 20, 1968

3,369,873
APPARATUS AND METHOD FOR CONTINUOUSLY MELTING A SOLID REACTANT
Hansjuergen Ullrich, Frankfurt am Main, and Manfred Dietze, Offenbach am Main, Germany assignors to Vickers-Zimmer Aktiengesellschaft Planung and Bau Von Industrieanlagen, Frankfurt am Main, Germany, a corporation of Germany
Filed July 9, 1964, Ser. No. 381,392
Claims priority, application Germany, July 11, 1963, Z 10,222
10 Claims. (Cl. 23—293)

The invention relates to a process for the melting of solids and to equipment which is particularly suitable for carrying out this process.

In many chemical processes that are carried out continuously—for example, in the continuous production of polyester from dimethyl terephthalate (DMT) and glycol—a substance that is initially a solid (e.g. in crystalline, granular or pellet form (has to be melted down and continuously fed into the reaction equipment in the molten state. This requires the exercise of careful control and technique to ensure that the melt shall not contain any residual unmolten particles of solid matter. Moreover, in order to avoid the risk of deposit formation in passages traversed subsequently, it is often necessary to bring the melt to a temperature lying above its melting point and within a range largely determined by the properties of the raw material used.

For this requirement to be reliably fulfilled, the melting process has hitherto been carried out discontinuously, the solid raw material being melted down a charge at a time in a melting unit and, according to circumstances, heated beyond the melting point, the melt then being pumped into an intermediate tank from which the reaction equipment can be charged continuously. This method, however, has the disadvantage that heat-sensitive substances may undergo fluctuations in quality because of variations in the times they stay in various parts of the equipment. In addition to this, the additional maintenance and service of the melting unit makes the method cumbersome and a complicated system of control is needed in the case of fully automatic processing.

According to the invention there is provided a process for melting solid materials which comprises feeding the solid materials directly into molten material in a melting unit, extracting molten material from said unit near the liquid level, returning at least a part of the extracted molten material to the unit near the bottom thereof, and heating the extracted molten material to a temperature above the melting point thereof. The withdrawal and recharging of a portion of the molten mass establishes circulation upwardly through the mass to effect efficient heat exchange.

The process of the invention thus facilitates the operation of a completely continuous process whereby the flow of material may be simply and satisfactorily regulated to what is needed for charging the reaction equipment. The melting process can consequently take place in a relatively small, compact melting unit, which can be regulated conveniently and without great effort for automatic processing. There being no longer any intermediate storage of melted material, the risk of fluctuations in quality due to variations in the time spent by the material at various points is eliminated. Furthermore, there is no difficulty in keeping the melt that goes to the reaction equipment free from unmelted solid particles and it can be maintained, if need be, at any desired temperature above melting point.

For carrying out the process of the invention, the invention also provides the apparatus for melting solid materials comprising a melting unit, a circulatory path extending externally of said unit and connecting near the top and bottom thereof, means for continuously circulating molten material from said unit along said path and back to said unit, means for heating the circulated molten material to a temperature above the melting point thereof and means within said unit operable to direct solid material charged thereto to produce relative motion between said solid material and said molten material flowing in said unit.

It is of advantage for the melting unit to be provided with an auxiliary heating surface to facilitate the starting up of the plant. In this way, when starting up, the heat needed for warming up and for melting is transmitted from the heating surface of the melting unit, whereas this heat, during normal running, is supplied to the solid material, for the most part, by the material that has already been melted and is at a temperature above melting point.

Figure 2:
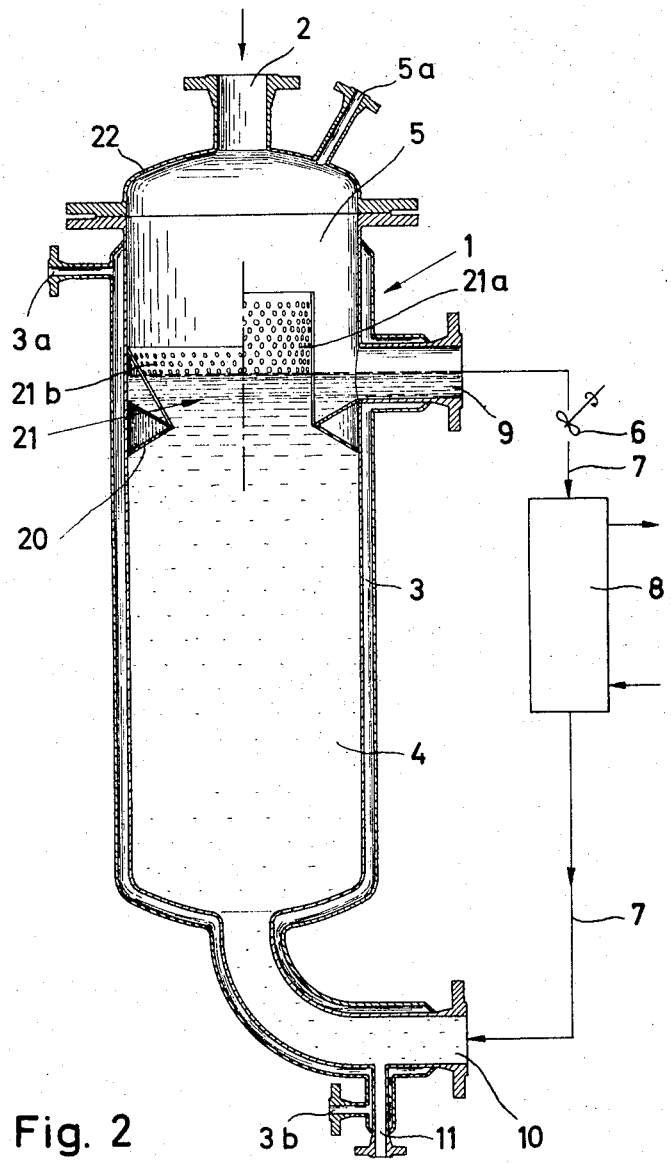
Figure 3:
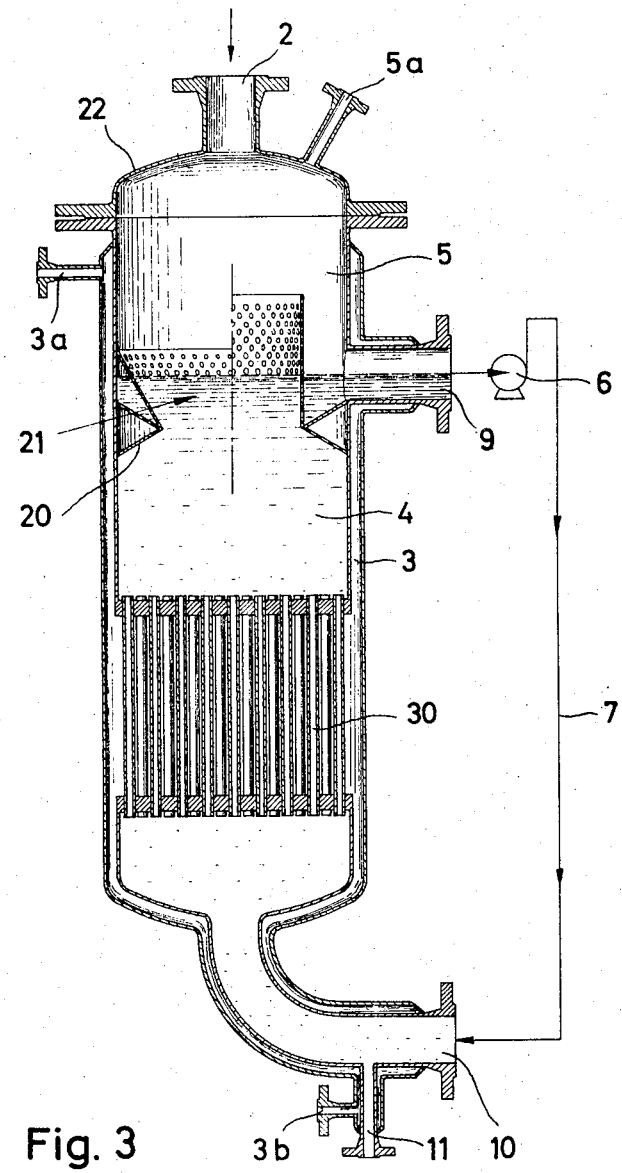

Some embodiments of the invention will now be described by way of example, reference being made to the accompanying drawings, in which:

FIGURE 1 shows one form for a melting unit suitable for carrying out the melting process; and FIGURES 2 and 3 show modified forms of the melting unit appearing in FIGURE 1.

The following typical forms of the invention comprise a melting unit which can be charged with solid material continuously or—subject to the charge being maintained at a given level, to within certain limits—so much at a time. All the examples are based on the same principle, which is fundamental to the process, namely that of circulating the melt from the unit through a heat exchanger and back to the melting unit to provide heat to and effect heat exchange with fresh solids, a continuous flow of melt being tapped off the circulation system. The only difference lies in the constructional details of the melting unit.

In that form of the invention shown in FIGURE 1, there is provided a melting unit 1, preferably in the form of a vertical cylinder, provided at the top with a connection 2, for the charging of solid material, which is used in small grains of some kind (crystals, granules or pellets, for example). Melting unit 1 has an external heating jacket 3, which, with the aid of connections 3a and 3b, can be inserted into a system through which a heating fluid circulates. The interior of the melting unit is divided into a melting compartment 4, which is filled with a mixture of the melt and the still unmelted solid material, and an upper gas compartment 5. If required, for "clouding" purposes, the gas compartment 5 can be filled through a connection 5a with an inert gas, such as nitrogen, which subsequently escapes by way of the charging connection 2 and the units connected thereto—in which case it is desirable to provide a pressure control in the inert gas supply pipe.

From melting unit 1, a melt circulation pipe or conduit 7 extends externally of the unit from the boundary between the compartment 4 and the space 5 through a heat exchanger 8 and back into the lower end of the compartment 4. This circulation pipe 7 may preferably include, as shown, a circulating pump 6, such as, for example, a peripheral impeller. The pipe or conduit 7 extends from a draw-off connection 9, in the upper part of melting compartment 4, and ends at a return connection 10, communicating with the lower part of melting compartment 4. A tapping connection, 11 is provided through which the melt can be continuously withdrawn and this is preferably provided in that section of the pipe 7 which lies beyond heat exchanger 8 considered in the direction of the flow.

The melting unit illustrated in FIGURE 1 is designed more particularly for cases in which there are marked differences in specific gravity between the continuously charged solid material and the molten mass which is in circulation. These differences in specific gravity are turned to account in inducing relative motion between the solid particles and the melt flowing through the melting unit. By means of a guide insertion 12 and a riser pipe 13, the melt and the solid particles are brought together in such a way that substantially all the solid particles are melted when the flow of melt has reached the vicinity of the draw-off connection 9. The pipe 13 extends from the vicinity of the return connection 10, through the melting compartment 4, and discharges near the boundary between gas compartment 5 and the melting compartment 4. The guide insertion 12, which is preferably in the form of a hollow cylinder open at both ends surrounds the top of pipe 13 concentrically and projects into the gas compartment 5, its top rim lying at a distance at least of the order of its own diameter from the opening of charging connection 2. The bottom rim of the guide insertion 12 ends some considerable distance away from the bottom of the melting compartment 4. The two components 12 and 13 are coaxially arranged and lie vertically below the charging connection 2.

When the plant is started up, the charged solid material drops through the substantially annular space 14 between the riser pipe 13 and the guide insertion 12, into the lower part of melting compartment 4, a cover 16 over the top end of the riser pipe 13 prevents access of the solid matter to interior of the riser pipe 13. Once the bottom part of melting compartment 4 has been filled the space 14 also fills. As soon as the space 14 has been filled as far as the top rim of the guide insertion 12 and the natural angle of slope is exceeded, the solid material continues to trickle into the space 15—likewise substantially annular—between the guide insertion 12 and a heating jacket 3 surrounding the melting unit 1. The heat given out by the jacket 3 thereupon brings about the melting of this initial charge. The melting compartment 4 then having filled with melted material, the circulation pipe 7 comes into play and returns the continuously tapped-off melt to the melting compartment 4, by way of heat exchanger 8, in which the melt is heated to a predetermined temperature above melting point, the pump 6 bringing about the requisite forced circulation.

Once the plant is running normally, the heated melt brought back through the return connection 10 is substantially able to transmit the heat required for heating up and melting the solid particles charged to the unit. This melt emerges from the connection 10 and flows through the riser pipe 13, at the upper end of which it passes through side discharge apertures 17 into the annular space 14, carrying with it the solid material being continuously fed in through the connection 2. In the space 14, the solid particles and the melt move downwards (in the direction of the arrow) at moderate speed, the solid particles, owing to their higher specific gravity, falling at a rate exceeding that of the flow of the melt. Upon reaching the bottom end of the guide insertion 12, the flow of melt is again directed upwards (in the direction of the arrow) and arrives in the space 15, in the upper part of which the draw-off connection 9 is situated. It is an advantage for the bottom end of the guide insertion 12 to have a beaded rim, 12a, for guiding the flow. If the solid particles sinking in the space 14 are not too large, they will follow the flow of the melt into space 15, though their specific gravity will cause them to rise at a rate below that of the flow of melt. The time during which the solid particles remain in the space 15 is such that they have completely melted by the time they reach the draw-off connection 9. This means that the melt conveyed into the heat exchanger 8 is already practically free from solid matter.

For over-large particles, the time of dwell in the space 15 would not suffice for complete melting. The design of the equipment is therefore such that the solid particles of a size exceeding a certain limit, instead of following the flow of the melt from the space 14 to the space 15, first sink farther into the lower part of the melting compartment 4 upon leaving the space 14. There they remain until they have been so reduced in size by further melting that they can be carried along with the flow of melt upwards into the space 15. This ensures that over-large particles do not get into that part of the melt which flows to the draw-off connection 9 until they have been reduced to below a maximum size that will ensure complete melting.

In the vicinity of the opening of the return connection 10, which is in the bottom of melting compartment 4, the riser pipe 13 may advantageously be provided with nozzle-like intake apertures 18, by which the lower part of the melting compartment 4 communicates with the interior of the riser pipe 13. Through these apertures, the melt flowing upwards in the riser pipe 13 constantly draws some quantity of melt from the compartment 4, and also, according to circumstances, still unmelted solid particles, from the lower part of melting compartment 4, thus ensuring that a continuous flow of melt is also maintained in the lower part of melting compartment 4. The solid particles carried along are completely melted as they pass up the riser pipe 13.

The relative motion occurring in the melting compartment between the solid particles and the melt has a particularly favourable effect on the heat transmission, which is consequently effected not by conduction alone, but predominantly by convection. Hence, by the appropriate dimensioning and layout of the equipment and a constant feed of solid material at the charging connection 2, the melting process can readily be so pre-determined and regulated that an amount of melt corresponding to the solid particles fed in can be continuously taken away through the tapping connection 11 at a temperature which can be adjusted to suit requirements.

A melting unit of the form described above is less suitable when the difference in specific gravity between the solid material and the melt is only small. In such a case, the form illustrated in FIGURE 2 is suitable. The only material difference between this and the form shown in FIGURE 1 lies in the nature and the arrangements of the internal fittings. For this reason, corresponding parts in both drawings are similarly numbered.

Once again, the solid particles reach the melting compartment 4 through the charging connection 2. In the upper part of melting compartment 4, below the draw-off connection 9, a displacement or guide body 20 is fitted, to avoid dead space and consequent harm to the product. Starting from the body 20, a strainer insertion 21 runs upwards, extending into the gas compartment 5. This strainer, which may have either a cylindrical outer face, 21a (on the right in FIGURE 2) or an inverted frustoconical outer face, 21b (on the left in FIGURE 2), leaves a passage open to the melting compartment 4 for the solid particles. The purpose of this strainer is to prevent particles of foreign matter and unmelted solid particles from gaining access to the draw-off connection 9. So that this strainer 21 may be easy to clean, the top 22 of the melting unit 1 may well be removable. The construction of strainer insertion 21 as a cylinder 21a which is open at the top constitutes a precaution of sorts against sudden fouling, since the cylinder 21a acts as an overflow, should the level of the fluid in the melting compartment 4 rise above the normal.

When the initial charge of the melting unit 1 has been melted by the heating jacket 3 and the melting compartment 4 has filled with the melt, this melt flows through the strainer 21 and draw-off connection 9 into the circulation pipe 7, from which a portion of the melt (as in the case of the first installation described) is drawn off through the tapping connection 11. The remaining portion of the melt is returned to the melting compartment 4 by way of the return connection 10 at the temperature pre-determined by heat exchanger 8. The solid material continuously fed into the equipment falls straight into the melting compartment 4, where, if the particles of material are large enough, they at first sink slowly against the upward flow of melt, start to melt and then, their volume and mass having been reduced, again flow upwards with the current. Together with those solid particles that were small at the outset, they accumulate as a porous layer in front of the strainer 21, where the hot melt passes through them and melts them further. Very small solid particles may perhaps pass through strainer insertion 21, but then their size will be only such that they become completely melted by the time they have passed to the heat exchanger 8.

The form of the invention illustrated in FIGURE 3 is the same as that shown in FIGURE 2, with the sole difference that here, instead of lying outside melting unit 1 in the circulation pipe 7, the heat exchanger is inside the melting compartment 4 itself and is shown as a heater insertion 30 in the lower part of melting compartment 4 and disposed above the opening of the return connection 10. The heating-fluid side of this heater 30 is connected to the heating jacket 3 for the common supply of heating fluid. The version shown in FIGURE 3 is particularly advantageous where rapid starting of melting equipment is desired, because the provision of the heater 30 inside the melting compartment 4 makes a considerably larger heating surface available for melting the initial charge. This form of the invention is preferable only for melting materials that have no tendency to clog, that is to say those that melt suddenly and do not form bridges of solid matter. With the FIGURE 3 version, too, of course, a further heat exchanger can additionally be provided in the circulation pipe 7, externally of the melting unit 1, should this be found desirable for any reason.

Fully automatic working is possible with all the variant forms of the invention described above, it being necessary merely to provide means of regulating the level.

We claim:

1. Apparatus for melting solid materials comprising a melting unit having a chamber, the lower part of which forms a melting compartment and the upper part of which forms a gas space, a take-off conduit connecting to said unit at a first point intermediate said gas space and said melting compartment and extending externally downwardly and reconnecting to said melting compartment at a second point below said draw-off, means for continuously circulating molten material through said conduit and said compartment, means in the path of said circulating molten material to heat same to a temperature above the melting point thereof, pipe means disposed within said melting unit and extending upwardly from said second point to the level of said first point to constrain the flow of at least a part of the circulating molten material returned from said conduit.

2. Apparatus according to claim 1 including a cylindrical guide disposed about the upper end of said pipe means to define therewith an annular space intended to receive molten material overflowing from said pipe means and to cause said overflowed material to flow in counterflow to the material in said pipe means, said cylindrical guide extending into said gas space above said first point and means for directing solid material charged to said unit into said annular space.

3. Apparatus according to claim 1 wherein the means for charging solid material to the unit comprises an opening coaxially disposed above the pipe means and the cylindrical guide, the upper end of the cylindrical guide terminating in said gas space being spaced from said opening by a distance corresponding to at least one diameter of the cylindrical guide.

4. Apparatus according to claim 1 wherein said cylindrical guide is formed within said compartment with an annular reinforcing bead.

5. Apparatus for melting solid materials comprising an elongated melting unit, means for heating said unit, a filler opening at the top thereof, an outlet opening at the bottom thereof, a draw-off intermediate said filler and outlet, a conduit connecting said draw-off and said outlet, heat exchanger means disposed in said conduit, pump means disposed in said conduit for continuously circulating molten material through said conduit, said heat exchanger and back into said unit at said outlet, means within said unit opposite said draw-off and aligned with said filler opening to isolate from said draw-off solid material fed through said filler, and means for tapping molten material from said conduit adjacent said outlet.

6. The apparatus of claim 5 in which said isolating means comprises a perforated cylinder.

7. Apparatus for melting solid materials comprising an elongated melting unit, means for heating said unit, a filler opening at the top thereof, an outlet opening at the bottom thereof, a draw-off near the top of said unit which defines the liquid level within said unit, a conduit connecting said draw-off and said outlet, heat exchanger means disposed in said conduit, pump means disposed in said conduit for continuously circulating molten material from said draw-off downwardly through said conduit back into said unit and upwardly through said unit to complete the circle and means for tapping molten material from said conduit adjacent said outlet.

8. In a method for continuously melting small grains of reactant solids for producing resins comprising the steps of melting a mass of said solids, adding fresh solids, and providing heat to melt said fresh solids by withdrawing a portion of said mass, heating said portion above the melting point of said reactant solids and charging it back to said mass, the improvement which comprises charging said fresh solids directly into said molten mass and continuously circulating said mass by withdrawing said portion near the surface of the mass and charging it into the mass near the bottom thereof to establish flow generally upwardly therethrough.

9. The method of claim 8 in which molten reactant solids are tapped near the bottom of the mass.

10. The method of claim 8 in which said fresh solids are charged on to the surface of said mass and confined there until they melt.

References Cited

UNITED STATES PATENTS

| | | | |
|---|---|---|---|
| 2,877,495 | 3/1959 | Wegener et al. | 126—343.5 |
| 2,467,529 | 4/1949 | Hormel | 23—290.5 X |
| 2,199,670 | 5/1940 | Lowry | 260—412.6 X |

JAMES H. TAYMAN, Jr., *Primary Examiner.*